(12) United States Patent
Moschek et al.

(10) Patent No.: US 11,938,795 B2
(45) Date of Patent: Mar. 26, 2024

(54) VEHICULAR VISION SYSTEM WITH GLARE REDUCING WINDSHIELD

(71) Applicant: Magna Electronics Inc., Auburn Hills, MI (US)

(72) Inventors: Marco Moschek, Frankfurt (DE); Dmitri Sandler, Waterford, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 771 days.

(21) Appl. No.: 16/949,127

(22) Filed: Oct. 15, 2020

(65) Prior Publication Data

US 2021/0114439 A1 Apr. 22, 2021

Related U.S. Application Data

(60) Provisional application No. 62/933,539, filed on Nov. 11, 2019, provisional application No. 62/916,962, filed on Oct. 18, 2019.

(51) Int. Cl.
*B60J 3/04* (2006.01)
*B60R 11/04* (2006.01)

(52) U.S. Cl.
CPC .............. *B60J 3/04* (2013.01); *B60R 11/04* (2013.01); *B60R 2300/105* (2013.01); *B60R 2300/8006* (2013.01); *B60R 2300/8033* (2013.01); *B60R 2300/8093* (2013.01)

(58) Field of Classification Search
CPC ...... B60J 3/04; B60R 11/04; B60R 2300/105; B60R 2300/8006; B60R 2300/8033; B60R 2300/8093

USPC ........................................................... 701/36
See application file for complete search history.

(56) References Cited

U.S. PATENT DOCUMENTS

| | | |
|---|---|---|
| 5,066,112 A | 11/1991 | Lynam et al. |
| 5,406,414 A | 4/1995 | O'Farrell et al. |
| 5,550,677 A | 8/1996 | Schofield et al. |
| 5,668,663 A | 9/1997 | Varaprasad et al. |
| 5,670,935 A | 9/1997 | Schofield et al. |
| 5,724,187 A | 3/1998 | Varaprasad et al. |
| 5,841,496 A | 11/1998 | Itoh et al. |
| 5,949,331 A | 9/1999 | Schofield et al. |

(Continued)

FOREIGN PATENT DOCUMENTS

JP 6519355 B2 * 5/2019 ............... B60R 1/00

*Primary Examiner* — Atul Trivedi
(74) *Attorney, Agent, or Firm* — HONIGMAN LLP

(57) ABSTRACT

A vehicular vision system includes a forward viewing camera disposed at and viewing through a windshield of a vehicle. A driver viewing camera is disposed in the vehicle and views the driver's eyes. A control, responsive to processing of image data captured by the forward viewing camera to determine a light source ahead of the vehicle, and responsive to processing of image data captured by the driver viewing camera to determine a gaze direction of the eyes of the driver, determines a forward view path between the driver's eyes and the determined light source and determines a location where the determined forward view path intersects the windshield. The control, responsive to the determined light source having an intensity greater than a threshold level, controls the windshield to locally darken a region of the windshield that includes the location where the determined forward view path intersects the windshield.

31 Claims, 7 Drawing Sheets

(56) References Cited

U.S. PATENT DOCUMENTS

| | | | |
|---|---|---|---|
| 6,144,430 | A | 11/2000 | Kuo |
| 6,449,082 | B1 | 9/2002 | Agrawal et al. |
| 6,690,268 | B2 | 2/2004 | Schofield et al. |
| 6,717,639 | B2 | 4/2004 | Jung |
| 6,784,956 | B2 | 8/2004 | Matsumoto et al. |
| 6,824,281 | B2 | 11/2004 | Schofield et al. |
| 6,859,245 | B2 | 2/2005 | Faris et al. |
| 6,995,891 | B2 | 2/2006 | Agrawal et al. |
| 7,038,577 | B2 | 5/2006 | Pawlicki et al. |
| 7,184,190 | B2 | 2/2007 | McCabe et al. |
| 7,195,381 | B2 | 3/2007 | Lynam et al. |
| 7,255,451 | B2 | 8/2007 | McCabe et al. |
| 7,274,501 | B2 | 9/2007 | McCabe et al. |
| 7,310,178 | B2 | 12/2007 | Lawlor et al. |
| 7,480,149 | B2 | 1/2009 | DeWard et al. |
| 7,720,580 | B2 | 5/2010 | Higgins-Luthman |
| 7,855,755 | B2 | 12/2010 | Weller et al. |
| 7,914,187 | B2 | 3/2011 | Higgins-Luthman et al. |
| 8,256,821 | B2 | 9/2012 | Lawlor et al. |
| 9,487,159 | B2 | 11/2016 | Achenbach |
| 9,555,803 | B2 * | 1/2017 | Pawlicki ............ B60K 31/0008 |
| 9,596,387 | B2 | 3/2017 | Achenbach et al. |
| 9,871,971 | B2 | 1/2018 | Wang et al. |
| 9,896,039 | B2 | 2/2018 | Achenbach et al. |
| 10,227,046 | B2 | 3/2019 | Habibi |
| 10,319,272 | B1 * | 6/2019 | Carter ..................... G06F 3/012 |
| 11,082,630 | B2 | 8/2021 | Staab et al. |
| 11,130,391 | B2 * | 9/2021 | Choi ......................... B60J 3/04 |
| 2009/0295181 | A1 | 12/2009 | Lawlor et al. |
| 2011/0204209 | A1 | 8/2011 | Barrows |
| 2011/0273659 | A1 | 11/2011 | Sobecki |
| 2014/0160284 | A1 | 6/2014 | Achenbach et al. |
| 2014/0226012 | A1 | 8/2014 | Achenbach |
| 2014/0336876 | A1 | 11/2014 | Gieseke et al. |
| 2015/0009010 | A1 | 1/2015 | Biemer |
| 2015/0015710 | A1 | 1/2015 | Tiryaki |
| 2015/0015713 | A1 | 1/2015 | Wang et al. |
| 2015/0022664 | A1 | 1/2015 | Pflug et al. |
| 2015/0077826 | A1 * | 3/2015 | Beckman ............ H04N 23/687 359/601 |
| 2015/0219809 | A1 | 8/2015 | Ruhnau et al. |
| 2015/0232030 | A1 | 8/2015 | Bongwald |
| 2015/0294169 | A1 | 10/2015 | Zhou et al. |
| 2015/0296135 | A1 | 10/2015 | Wacquant et al. |
| 2015/0327398 | A1 | 11/2015 | Achenbach et al. |
| 2015/0352953 | A1 | 12/2015 | Koravadi |
| 2016/0137126 | A1 | 5/2016 | Fursich et al. |
| 2016/0288699 | A1 * | 10/2016 | Solar ....................... B60R 11/04 |
| 2017/0177000 | A1 | 6/2017 | Meyhofer et al. |
| 2018/0111451 | A1 * | 4/2018 | Martens ................... B60J 3/04 |
| 2018/0126907 | A1 * | 5/2018 | Jeromin ................... B60R 1/00 |
| 2019/0168586 | A1 * | 6/2019 | Paepcke ................. B60N 2/002 |
| 2019/0179320 | A1 * | 6/2019 | Pacala ................... G05D 1/0214 |
| 2019/0217780 | A1 * | 7/2019 | Yamaguchi ............... B60R 1/10 |
| 2019/0244040 | A1 * | 8/2019 | Herrmann ................ B60R 1/00 |
| 2020/0101906 | A1 * | 4/2020 | Kobayashi ........... G06V 10/143 |
| 2021/0114439 | A1 * | 4/2021 | Moschek ................ B60R 11/04 |
| 2021/0237651 | A1 * | 8/2021 | Larson ..................... B60R 1/04 |

* cited by examiner

VEHICULAR VISION SYSTEM WITH GLARE REDUCING WINDSHIELD

CROSS REFERENCE TO RELATED APPLICATIONS

The present application claims priority of U.S. provisional application Ser. No. 62/933,539, filed Nov. 11, 2019, and U.S. provisional application Ser. No. 62/916,962, filed Oct. 18, 2019, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Under normal driving conditions it is often the case that a vehicle driver is dazzled or bothered by an oncoming vehicle's headlights, particularly when the oncoming vehicle has its bright lights on. While a sun visor may help to shield the driver's eyes from glare from the sun or elevated light source, it does not provide glare relief to the driver for glare from lights of oncoming vehicles.

SUMMARY OF THE INVENTION

The present invention provides a driver assistance system or vision system or imaging system for a vehicle that provides a dynamic blocking or attenuating of headlights of oncoming vehicles or other bright lights that may be ahead of the subject vehicle and that may be bothersome to the driver of the subject vehicle.

To avoid the subject vehicle driver from being bothered or dazzled or temporarily blinded by such external light sources ahead of the vehicle, the vehicle windshield can create black spots or darkened spots or reduced light-transmitting regions. With these darkened spots or reduced light-transmitting regions, the bright light emitted by the light sources will be covered or attenuated so that the driver is no longer dazzled or temporarily blinded by the lights. These darkened spots or reduced light-transmitting regions may move to follow the lights dynamically and will change his size as needed. Also, the intensity or darkness or transmissivity of each spot or reduced light-transmitting region can change dynamically so that it corresponds with the intensity of the external light. The spots or reduced light-transmitting regions may also have smooth gradient border transitions from black (or dark) to transparent to avoid a hard dark-transparent contrast.

These and other objects, advantages, purposes and features of the present invention will become apparent upon review of the following specification in conjunction with the drawings.

DESCRIPTION OF THE PREFERRED EMBODIMENTS

Figure 1:
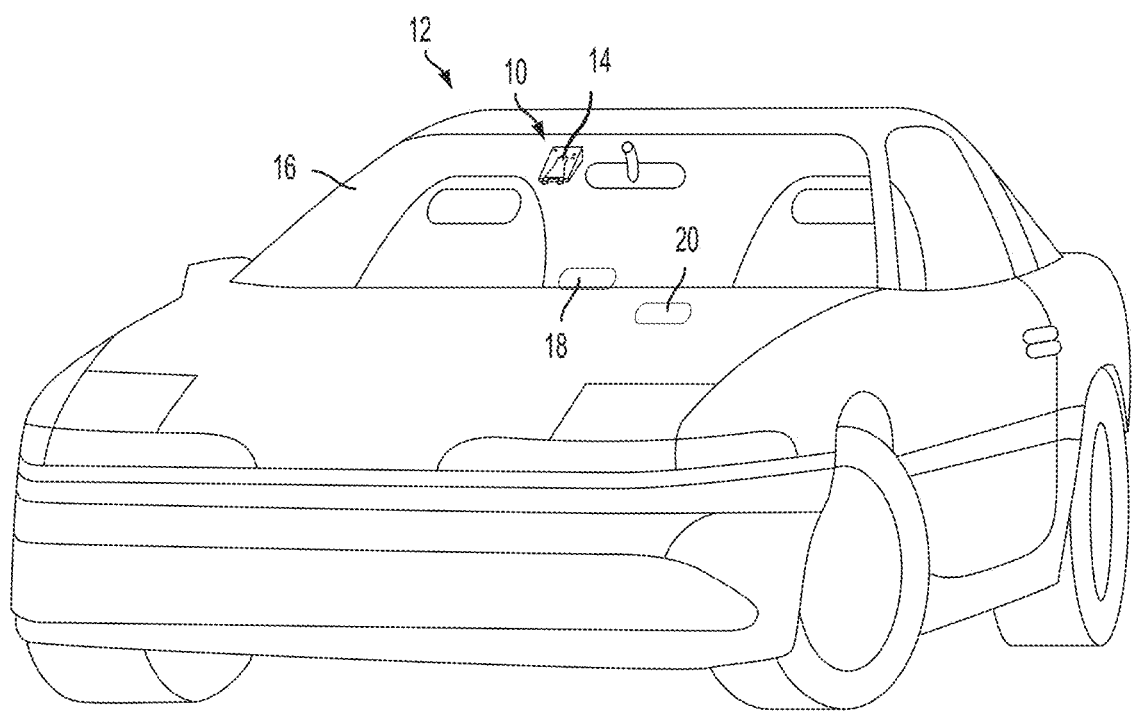
FIG. 1 is a perspective view of a vehicle having a vision system and a locally dimmable windshield in accordance with the present invention.

Referring now to the drawings and the illustrative embodiments depicted therein, a vision system 10 for a vehicle 12 includes at least one exterior viewing imaging sensor or camera 14, such as a forward viewing imaging sensor or camera, which may be disposed at and behind the windshield 16 of the vehicle and viewing forward through the windshield so as to capture image data representative of the scene occurring forward of the vehicle (FIG. 1). The system also includes a driver monitoring system 18 having an in-cabin camera viewing the driver's head and/or eyes for determining eye position and/or gaze direction of the driver. Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera 14 disposed at the windshield of the vehicle and viewing through the windshield and forward of the vehicle may capture image data for a machine vision system or driving assist system (such as for traffic sign recognition, headlamp control, pedestrian detection, collision avoidance, lane marker detection and/or the like). The vision system 10 includes a control or electronic control unit (ECU) or processor 20 that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

The windshield 16 comprises an active partially dimmable windshield, which may comprise an electro-optic medium (such as an electrochromic medium) sandwiched between two glass sheets or panels, or may comprise a locally dimmable liquid crystal window construction or the like. The control 20, responsive to processing by a processor of image data captured by the forward viewing camera 14, determines presence of a light source ahead of the vehicle and, responsive to processing by a processor of image data captured by the in-cabin camera 18, determines the driver's eye location and/or gaze direction. The control determines a viewing path between the driver's eyes and the detected light source and controls the windshield so as to locally dim or darken a portion (or portions) of the windshield (while the non-darkened rest of the windshield remains transparent or light-transmitting) where the determined viewing path passes through the windshield, such that the locally dimmed or darkened portions or regions are partially non-light-transmitting so as to block or attenuate or dim the bright light in the driver's view.

Figure 2:
FIG. 2 is an image of lights, such as headlights of a vehicle, forward of the vehicle as may be viewed by the driver of the vehicle.
Figure 4:
FIG. 4 is an image of a single light, such as a headlight of a motorcycle, forward of the vehicle as may be viewed by the driver of the vehicle.

With the help of the forward viewing or front facing camera 14, the upcoming light sources are be detected. The system, via processing of image processing of image data captured by the camera 14, determines the size, brightness/intensity and location or position, in real Cartesian coordinates (or any coordinate system or reference system that aids in determining location of the light source relative to the vehicle and/or driver's eyes), of the detected light spots ahead of the vehicle (see, for example, FIGS. 2 and 4). This information is communicated to or provided to the ECU of the active partially dimmable windshield.

Concurrently with determination of size, intensity and location of the light sources, the in-cabin camera 18 will detect the human eyes of the driver and, via processing of image data captured by the camera 18, the system determines the driver's viewing direction or gaze direction. This information is also communicated to or provided to the ECU of the active partially dimmable windshield.

Based on this two information's from the forward viewing camera 14 and the in-cabin camera 18, the ECU of the active partially dimmable windshield determines if the driver is dazzled (which may be determined at least in part to the relative location of the detected light source to the driver's eyes and the determined intensity of the detected light source). For example, the control may determine that a windshield region for a detected light source should be darkened when it determines that the light source has a brightness or intensity of, for example, greater than 300 lux, or greater than 500 lux or greater than 1,000 lux or more, depending on the particular application. If the intensity increases (such as if the oncoming vehicle headlights are switched from a low beam setting to a high beam setting), the system may increase the darkening of the respective windshield region to reduce or avoid dazzling of the driver of the vehicle.

Figure 3:
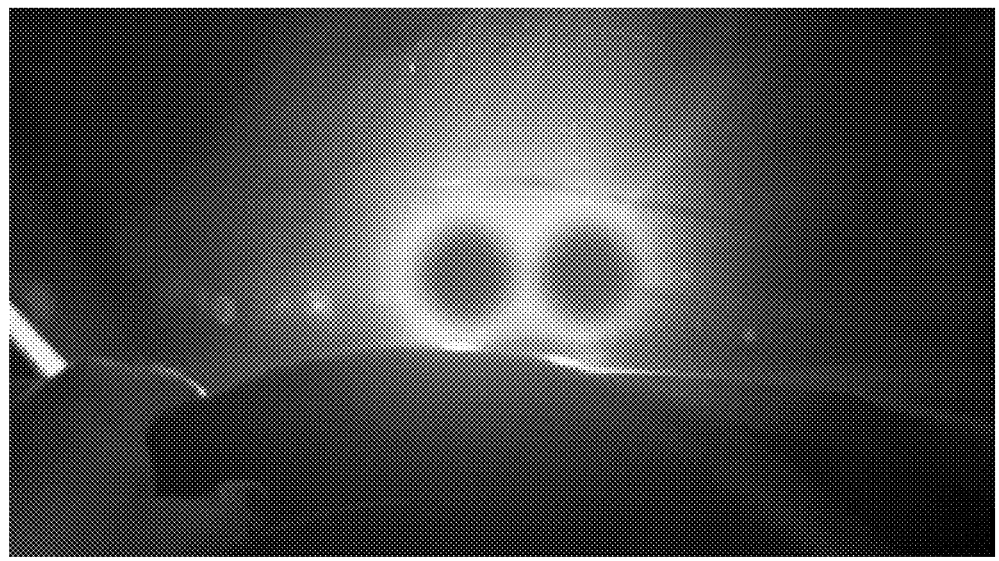
FIG. 3 is the image of FIG. 2, with darkened regions generated at the windshield at locations along the driver's view path where the view path intersects or passes through the windshield.
Figure 5:
FIG. 5 is the image of FIG. 4, with a darkened region generated at the windshield at the location along the driver's view path where the view path intersects or passes through the windshield.

If the ECU or system determines that the driver is dazzled by a particular light source, the ECU will (based on the location of the light source and the driver's eyes relative to one another and relative to the windshield) calculate the position at the windshield where the driver's viewing path (between the driver's eyes and the particular light source) passes through the windshield and will adjust the windshield to cover or darken these positions with a darkened region or dark spot (see, for example, FIGS. 3 and 5). Such calculation may take into account the distance of the driver's eyes from the windshield and the angle or slant of the windshield and a determined or estimated distance to the detected light source.

Figure 6:
FIG. 6 is an image of the sun forward of the vehicle as may be viewed by the driver of the vehicle.
Figure 7:
FIG. 7 is the image of FIG. 6, with a darkened region generated at the windshield at the location along the driver's view path where the view path intersects or passes through the windshield.

The system and active partially dimmable windshield will not only operate to darken or reduce visibility of or glare from light sources of approaching vehicles. The system and active partially dimmable windshield can also be used to provide glare relief to the driver for all glaring light sources, such as street lights or low sun conditions (see, for example, FIGS. 6 and 7), such as at morning or early evening.

Figure 8:
FIG. 8 is the image of FIG. 6, with a darkened band across the windshield to provide a variable sun-visor function.

Optionally, and such as for a sunrise or sunset condition where the sun provides a large bright light ahead of the vehicle, the system may provide a wide darkened region to cover more than just the spot of the sun, but also high intensity light across the windshield area. For example, and with reference to FIG. 8, a variable sunshade can be provided where a band across or at least partially across the windshield at a level of the light source or sun is darkened to reduce glare by the light source or sun at the driver's eyes. Optionally, such a variable sunshade (where the darkness may be varied responsive to the intensity of the light source (sun) ahead of the vehicle) may be switched on and off by the driver of the vehicle.

Figure 9:
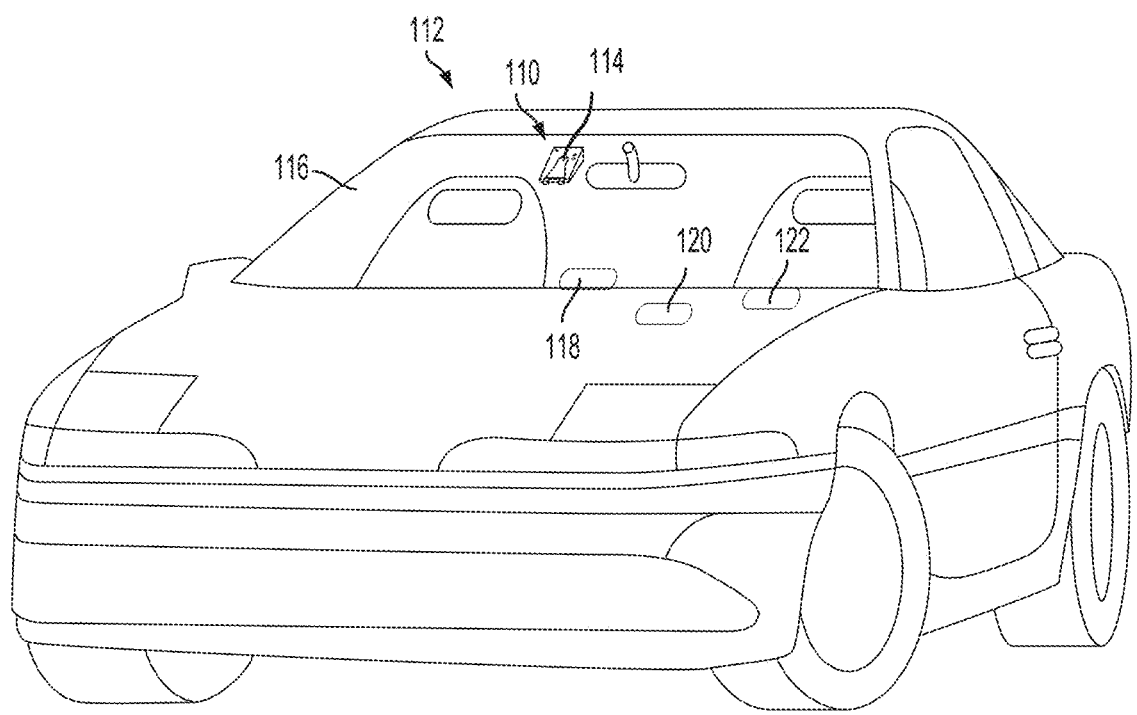
FIG. 9 is a perspective view of another vehicle having another vision system and a locally dimmable windshield in accordance with the present invention.
Figure 10:
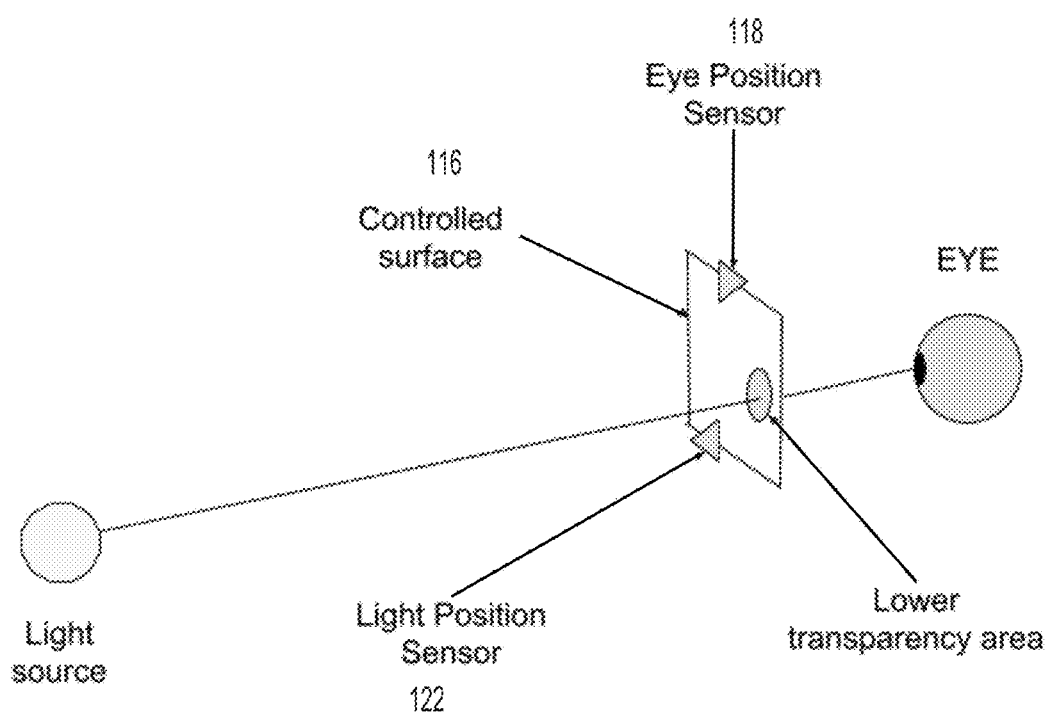
FIG. 10 is schematic showing the system of FIG. 9, with a controlled surface that adjusts light transmissivity at regions through which bright light from a light source passes.

Referring now to FIGS. 9 and 10, a vision system 110 for a vehicle 112 includes at least one exterior viewing imaging sensor or camera 114, such as a forward viewing imaging sensor or camera, which may be disposed at and behind the windshield 116 of the vehicle and viewing forward through the windshield so as to capture image data representative of the scene occurring forward of the vehicle. The system also includes a driver monitoring system 118 having an in-cabin camera viewing the driver's head and/or eyes for determining eye position and/or gaze direction of the driver. The system also includes a light sensor or optic sensor 122 that senses light ahead of the vehicle and determines a position of the light and/or a light path of the light relative to the driver's eyes and the vehicle windshield. Aspects of the vision system 110 may include or be included in the vision system 10, discussed above.

Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera 114 disposed at the windshield of the vehicle and viewing through the windshield and forward of the vehicle may capture image data for a machine vision system or driving assist system (such as for traffic sign recognition, headlamp control, pedestrian detection, collision avoidance, lane marker detection and/or the like). The vision system 110 includes a control or electronic control unit (ECU) 120 having a data processor and associated circuitry and software, with the data processor being operable to process image data captured by the light sensor and/or camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle.

The windshield 116 comprises a controlled surface or active partially dimmable windshield, which may comprise an electro-optic medium (such as an electrochromic medium) sandwiched between two glass sheets or panels, or may comprise a locally dimmable liquid crystal window construction or the like. The control 120, responsive to processing by a processor of data captured by the forward sensing light sensor 122 (and/or processing of image data captured by the forward viewing camera 114), determines presence of light sources ahead of the vehicle and, responsive to processing by a processor of image data captured by the in-cabin camera 118, determines the driver's eye location and/or gaze direction. The control determines a light path between the detected light source and the driver's eyes and controls the windshield so as to locally dim or darken a portion (or portions) of the windshield (while the non-darkened rest of the windshield remains transparent or light-transmitting) where the determined viewing path passes through the windshield, such that the locally dimmed or darkened portions or regions are partially non-light-transmitting so as to block or attenuate or dim the bright light in the driver's view.

Flash blindness is a temporary visual impairment of the driver when the driver's eyes are exposed to high intensity light ahead of the vehicle. The symptoms might last from few seconds to multiple minutes. During that time an operator may be unable to react to variety of situations. The controlled surface or windshield comprises a transparent material that is capable of changing its degree of transparency or light transmissivity in different regions at the windshield. The controlled surface may be a variably transmissive device or element that is disposed at the windshield (such as at the in-cabin surface of the vehicle windshield) or may be part of the windshield itself (whereby the windshield comprises a laminate windshield having an electro-optic or electrochromic material or medium disposed between two glass sheets).

To prevent flash blindness, the controlled surface can be used to allow the system to temporarily change transparency of the controlled surface and/or windshield to alleviate the effect of flash blindness. As shown in FIG. 10, the eye position sensor or driver monitoring system 118 tracks the operator's eye position and exposure to light sources forward of the vehicle. The light position sensor 122 detects and tracks a variety of light sources present exterior and forward of the vehicle and determines the intensity of light emitted by the detected light sources. The microcontroller 120, responsive to determination of the location of the driver's eyes and to determination of the location and intensity of detected light sources ahead of the vehicle, determines if flash blindness can occur. If the microcontroller determines that any light source intensity is significantly higher than the intensity of light emitted by other light sources, the microcontroller uses vector projection to determine at what position the higher intensity light penetrates or passes through the controlled surface/windshield to reach an eyes of the driver.

With that position or location at the controlled surface determined, the microcontroller sends a signal to the control surface to lower the transparency at that region or location. For example, the controller may operate to reduce the visible light transmissivity of the control surface at a particular coordinate (X, Y) of the control surface (such as at a center point of the light path between the light source and the driver's eyes, with radius (R) around that coordinate (with R being selected depending on the size and intensity of the light source, with at a particular degree of attenuation (D), with the degree of attenuation being determined based on the intensity of light emitted by the light source and the intensity of other light sources detected ahead of the vehicle. Thus, the output of the controller may provide values for X, Y, R, D, whereby the control surface reduces visible light transmissivity at the appropriate location and size region. The process loops infinitely during normal operation of the vehicle, such as when the vehicle is being driven forward along a road.

The system thus determines the location at the windshield where light from a bright light source ahead of the vehicle will pass along a light path from the light source to the driver's eyes. The system determines the driver's eye location relative to the windshield via processing of data captured by the eye position sensor or driver monitoring system, and determines the location of the light source relative to the windshield via processing of data captured by the forward viewing camera and/or light position sensor. Based on the determined relative locations of the driver's eyes and light source relative to the windshield, the system can determine where the light path will intersect and pass through the windshield (taking into account the angle of the windshield). The system controls or adjusts the light transmissivity of the windshield (or control surface) at that location, and adjusts the light transmissivity of the windshield (or control surface) at a region around that point, with the size or radius of the region being determined based on light intensity and size of the light source. The system controls or adjusts the degree of the light transmissivity of the darkened region responsive to the determined intensity of the light emitted by the light source.

For example, the control may determine that a windshield region for a detected light source should be darkened when it determines that the light source has a brightness or intensity of, for example, greater than 300 lux, or greater than 500 lux or greater than 1,000 lux or more, depending on the particular application. If the intensity increases (such as if the oncoming vehicle headlights are switched from a low beam setting to a high beam setting), the system may increase the darkening of the respective windshield region to reduce or avoid dazzling of the driver of the vehicle.

If the ECU or system determines that the driver is dazzled by a particular light source, the ECU will (based on the location of the light source and the driver's eyes relative to one another and relative to the windshield) calculate the position at the windshield where the driver's viewing path (between the driver's eyes and the particular light source) passes through the windshield and will adjust the windshield to cover or darken these positions with a darkened region or dark spot or lower visible light transmissivity. Such calculation may take into account the distance of the driver's eyes from the windshield and the angle or slant of the windshield and a determined or estimated distance to the detected light source.

The threshold level of light intensity of the detected light source at which the control determines whether or not to reduce visible light transmissivity at the controllable transparent element may vary responsive to the determined ambient light level (e.g., a bright light in darkness ahead of the vehicle will be much more likely to cause flash blindness than the same light on a sunny day) and responsive to other detected light sources (e.g., a bright light when by itself in darkness ahead of the vehicle will be much more likely to cause flash blindness than the same light when there are multiple lights also emitting light ahead of the vehicle, such as in city driving conditions).

Thus, the threshold level dynamically varies with the determined ambient light at or ahead of the vehicle and/or with the determined activity level of light (e.g., the number of other light sources determined ahead of the vehicle). The ambient light level may be sensed or determined via a separate ambient light sensor or via the forward viewing camera. Thus, during nighttime or lower ambient lighting driving conditions, the threshold level at which the system locally darkens the windshield or controllable element is lower than the threshold level at which the system locally darkens the windshield or element during daytime or higher ambient lighting driving conditions.

The system may be scaled depending on the particular applicant. For example, a smaller version might be implemented in eye glasses worn by a user, and a larger version can be implemented into or on the windshield of a vehicle. Optionally, the system may be implemented in goggles or glasses worn by pilots, such as for aviation applications. Optionally, the system may be implemented in goggles or glasses or face shields of astronauts to avoid temporary blindness during a spacewalk. While many new vehicles today are equipped with automatic high beam function (where the high beams of the vehicle headlights are automatically switched to low beams upon detection of a vehicle ahead), such a function or feature does not avoid flash blindness completely. There are many other light sources on the road that pose the danger, such as, for example, street lights, brake lights, sun reflections from snow and/or the like. Also in certain weather conditions, a driver may be bothered by a halo effect at the windshield, which blurs the source of the light.

The controllable transparent element or windshield is electrically variable to provide the selected darkened regions at the determined locations. The controllable transparent element or windshield may have multiple regions that are separately and independently energized (with electrically conductive layers at the glass sheets that are electrically isolated to provide the independently energizable regions) to provide the darkened regions (where one or more regions may be energized to provide the appropriate size and location of the darkened spot or spots). The degree of darkening of each darkened region may be variable and may be adjusted responsive to a determined intensity of the respective detected light source (and may darken more as the light intensity increases). The controllable transparent element or windshield or system may utilize aspects of the systems described in U.S. Publication Nos. US-2020-0296273 and/or US-2011-0273659, which are hereby incorporated herein by reference in their entireties. The windshield may comprise an electro-optic construction or a liquid crystal construction or the like (or any suitable construction that provides local dimming of regions of the windshield while not dimming other regions), such as by utilizing aspects of the assemblies and devices described in U.S. Pat. Nos. 10,227,046; 7,310,178; 7,274,501; 7,255,451; 7,195,381; 7,184,190; 6,690,268; 6,859,245; 6,784,956; 6,717,639; 6,449,082; 6,144,430; 5,841,496; 5,724,187; 5,668,663; 5,406,414 and/or 5,066,112, which are hereby incorporated herein by reference in their entireties.

The camera comprises a forward viewing camera, and may be disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The driver monitoring system/camera may utilize aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. No. 7,914,187 and/or Publication Nos. US-2016-0137126; US-2015-0352953; US-2015-0296135; US-2015-0294169; US-2015-0232030; US-2015-0022664; US-2015-0015710; US-2015-0009010 and/or US-2014-0336876, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The imaging sensors or cameras may capture image data for image processing and may comprise any suitable camera or sensing device, such as, for example, a two dimensional CMOS imaging array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera(s) and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352;

US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a forward viewing camera disposed at an in-cabin side of a windshield of a vehicle equipped with the vehicular vision system, the forward viewing camera viewing through the windshield forward of the vehicle, the forward viewing camera capturing image data;
   a driver viewing camera disposed in the vehicle and viewing at least the eyes of a driver of the vehicle;
   a control comprising circuitry and associated software;
   wherein the circuitry of the control comprises an image processor;
   wherein the windshield comprises a locally dimmable windshield that is operable, responsive to the control, to locally darken windshield regions of the windshield to reduce transmission of visible light through the windshield at the locally darkened windshield regions of the windshield;
   wherein image data captured by the forward viewing camera is processed to determined (i) a light source ahead of the vehicle, (ii) an intensity of the determined light source and (iii) a position of the determined light source relative to the vehicle;
   wherein image data captured by the driver viewing camera is processed to determine a gaze direction of the eyes of the driver;
   wherein the control, responsive to processing of image data captured by the forward viewing camera and responsive to processing of image data captured by the driver viewing camera, determines a forward view path between the eyes of the driver and the position of the determined light source and determines a location where the determined forward view path intersects the windshield; and
   wherein the control, responsive to the intensity of the determined light source being greater than a threshold level, controls the windshield to locally darken a windshield region that includes the location where the determined forward view path intersects the windshield.

2. The vehicular vision system of claim 1, wherein the control, responsive to determining multiple light sources ahead of the vehicle having respective intensities greater than the threshold level, controls the windshield to independently locally darken a plurality of windshield regions that each include a location where a respective determined forward view path intersects the windshield.

3. The vehicular vision system of claim 1, wherein the control adjusts a degree of darkening of the windshield region responsive to the intensity of the determined light source.

4. The vehicular vision system of claim 1, wherein the windshield around the locally darkened windshield region provides a transition from the darkened windshield region to an adjacent non-darkened windshield region of the windshield.

5. The vehicular vision system of claim 1, wherein the control dynamically controls the windshield to adjust the position of the darkened windshield region as the light source moves relative to the eyes of the driver.

6. The vehicular vision system of claim 1, wherein image data captured by the forward viewing camera is used for a driving assist system comprising at least one selected from the group consisting of (i) traffic sign recognition, (ii) headlamp control, (iii) pedestrian detection, (iv) collision avoidance and (iv) lane marker detection.

7. The vehicular vision system of claim 1, wherein the threshold level changes responsive to an ambient light level at or forward of the equipped vehicle.

8. The vehicular vision system of claim 7, wherein the threshold level is lower at lower ambient light levels and higher at higher ambient light levels.

9. The vehicular vision system of claim 1, wherein the locally dimmable windshield comprises an electro-optic medium sandwiched between two glass panels, and wherein the locally dimmable windshield locally darkens the windshield region responsive to an electrical current applied to the electro-optic medium.

10. A vehicular vision system, the vehicular vision system comprising:
    a forward sensing light sensor disposed at a vehicle equipped with the vehicular vision system, the forward sensing light sensor sensing forward of the vehicle, the forward sensing light sensor capturing sensor data;
    a driver monitoring system disposed in the vehicle and sensing at least the eyes of a driver of the vehicle;
    a control comprising circuitry and associated software;
    wherein the circuitry of the control comprises an image processor;
    a controllable transparent element disposed at a windshield of the vehicle, wherein the controllable transparent element comprises a locally dimmable element that is operable, responsive to the control, to locally darken regions of the controllable transparent element at the windshield to reduce transmission of visible light through the controllable transparent element at the locally darkened regions of the controllable transparent element;
    wherein sensor data captured by the forward sensing light sensor is processed to determine (i) a light source ahead of the vehicle, (ii) an intensity of the determined light source and (iii) a position of the determined light source relative to the vehicle;
    wherein the driver monitoring system determines an eye position of the eyes of the driver;
    wherein the control, responsive to processing of sensor data captured by the forward sensing light sensor and responsive to the determined eye position of the eyes of the driver, determines a light path between the eyes of the driver and the position of the determined light source and determines a location where the determined light path intersects the controllable transparent element at the windshield; and wherein the control, responsive to the intensity of the determined light source being greater than a threshold level, controls the controllable transparent element to locally darken a region of the controllable transparent element that includes the location where the determined light path intersects the controllable transparent element at the windshield.

11. The vehicular vision system of claim 10, wherein the controllable transparent element is disposed at an in-cabin side of the windshield.

12. The vehicular vision system of claim 10, wherein the controllable transparent element is incorporated in the windshield.

13. The vehicular vision system of claim 10, wherein the control adjusts a degree of darkening of the darkened region responsive to the intensity of the determined light source.

14. The vehicular vision system of claim 10, wherein the control dynamically controls the controllable transparent element to adjust the position of the darkened region as the light source moves relative to the eyes of the driver.

15. The vehicular vision system of claim 10, wherein the control, responsive to determining multiple light sources ahead of the vehicle having respective intensities greater than the threshold level, controls the windshield to independently locally darken a plurality of regions that each include a location where a respective determined light path intersects the controllable transparent element at the windshield.

16. The vehicular vision system of claim 10, wherein the controllable transparent element around the locally darkened region provides a transition from the darkened region to an adjacent non-darkened region of the controllable transparent element.

17. The vehicular vision system of claim 10, wherein the threshold level changes responsive to an ambient light level at or forward of the equipped vehicle.

18. The vehicular vision system of claim 17, wherein the threshold level is lower at lower ambient light levels and higher at higher ambient light levels.

19. The vehicular vision system of claim 10, wherein the forward sensing light sensor comprises a forward viewing camera.

20. The vehicular vision system of claim 19, wherein the forward viewing camera is disposed at the windshield and views through the windshield forward of the vehicle.

21. The vehicular vision system of claim 10, wherein the driver monitoring system comprises an interior cabin viewing camera.

22. The vehicular vision system of claim 10, wherein the locally dimmable element of the controllable transparent element comprises an electro-optic medium, and wherein the locally dimmable element locally darkens the region of the controllable transparent element responsive to an electrical current applied to the electro-optic medium.

23. A vehicular vision system, the vehicular vision system comprising:

a forward viewing camera disposed at an in-cabin side of a windshield of a vehicle equipped with the vehicular vision system, the forward viewing camera viewing through the windshield forward of the vehicle, the forward viewing camera capturing image data;

a driver viewing camera disposed in the vehicle and viewing at least the eyes of a driver of the vehicle;

a control comprising circuitry and associated software; wherein the circuitry of the control comprises an image processor;

a controllable transparent element disposed at the windshield of the vehicle, wherein the controllable transparent element comprises a locally dimmable element that is operable, responsive to the control, to locally darken regions of the controllable transparent element at the windshield to reduce transmission of visible light through the controllable transparent element at the locally darkened regions of the controllable transparent element;

wherein image data captured by the forward viewing camera is processed to determine (i) a light source ahead of the vehicle, (ii) an intensity of the determined light source and (iii) a position of the determined light source relative to the vehicle;

wherein image data captured by the driver viewing camera is processed to determine a gaze direction of the eyes of the driver;

wherein the control, responsive to processing of image data captured by the forward viewing camera and responsive to processing of image data captured by the driver viewing camera, determines a forward view path between the eyes of the driver and the position of the determined light source and determines a location where the determined forward view path intersects the controllable transparent element;

wherein the control, responsive to the intensity of the determined light source being greater than a threshold level, controls the controllable transparent element to locally darken a region of the controllable transparent element that includes the location where the determined forward view path intersects the controllable transparent element;

wherein the threshold level changes responsive to an ambient light level at or forward of the equipped vehicle; and wherein the control adjusts a degree of darkening of the darkened region of the controllable transparent element responsive to the intensity of the determined light source.

24. The vehicular vision system of claim 23, wherein the control, responsive to determining multiple light sources ahead of the vehicle having respective intensities greater than the threshold level, controls the controllable transparent element to independently locally darken a plurality of regions that each include a location where a respective determined forward view path intersects the controllable transparent element.

25. The vehicular vision system of claim 23, wherein the controllable transparent element is disposed at an in-cabin side of the windshield.

26. The vehicular vision system of claim 23, wherein the controllable transparent element is incorporated in the windshield.

27. The vehicular vision system of claim 23, wherein the controllable transparent element around the locally darkened region provides a transition from the darkened region to an adjacent non-darkened region of the controllable transparent element.

28. The vehicular vision system of claim 23, wherein the control dynamically controls the controllable transparent element to adjust the position of the darkened region as the light source moves relative to the eyes of the driver.

29. The vehicular vision system of claim 23, wherein image data captured by the forward viewing camera is used for a driving assist system comprising at least one selected from the group consisting of (i) traffic sign recognition, (ii)

headlamp control, (iii) pedestrian detection, (iv) collision avoidance and (iv) lane marker detection.

30. The vehicular vision system of claim 23, wherein the threshold level is lower at lower ambient light levels and higher at higher ambient light levels.

31. The vehicular vision system of claim 23, wherein the locally dimmable element of the controllable transparent element comprises an electro-optic medium, and wherein the locally dimmable element locally darkens the region of the controllable transparent element responsive to an electrical current applied to the electro-optic medium.

\* \* \* \* \*

UNITED STATES PATENT AND TRADEMARK OFFICE
CERTIFICATE OF CORRECTION

| | |
|---|---|
| PATENT NO. | : 11,938,795 B2 |
| APPLICATION NO. | : 16/949127 |
| DATED | : March 26, 2024 |
| INVENTOR(S) | : Marco Moschek et al. |

It is certified that error appears in the above-identified patent and that said Letters Patent is hereby corrected as shown below:

In the Claims

<u>Column 9</u>
Line 43, Claim 1, "processed to determined" should be --processed to determine--

Signed and Sealed this
Thirtieth Day of April, 2024

Katherine Kelly Vidal
*Director of the United States Patent and Trademark Office*